June 7, 1966  F. J. L. WOLFE  3,255,049
DRY CELL HAVING GEL ON DEPOLORIZER SURFACE
Filed Jan. 3, 1963
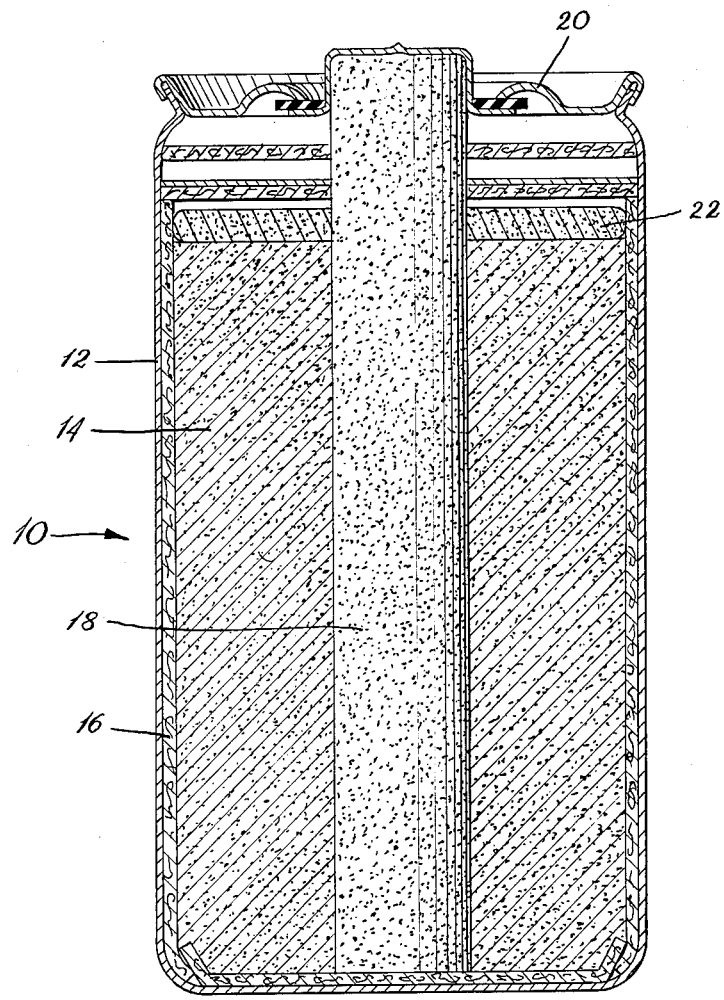
INVENTOR.
FRANCIS J. L. WOLFE
BY John R. Flaherty
ATTORNEY

United States Patent Office 3,255,049
Patented June 7, 1966

3,255,049
DRY CELL HAVING GEL ON DEPOLARIZER SURFACE
Francis J. L. Wolfe, Bay Village, Ohio, assignor to Union Carbide Corporation, a corporation of New York
Filed Jan. 3, 1963, Ser. No. 249,153
13 Claims. (Cl. 136—107)

This invention relates to dry cells, and refers more particularly to an improved dry cell having longer shelf and service life.

In the manufacture of dry cells, it is desirable to provide the cell with a sufficient amount of electrolyte so that maximum mix depolarizing efficiency is maintained for the life of the cell. During the manufacture of many types of dry cells, the depolarizing mix is usually stamped into a so-called bobbin (ordinarily with a carbon cathode current collector in the center thereof) or the mix is fed by a ram or extruded into paper-lined cells. However, in order to maintain maximum handling characteristics and productive capacity, the mix is generally too dry for best performance in cells. It therefore is frequently desired to add additional water or electrolyte to the mix after it is in place in the cell. This has previously been done by placing an absorbent washer impregnated with water or electrolyte on the top of the depolarizing mix or by just adding water without the aid of a washer on top of or adjacent the mix. Unfortunately, even the slightest amount of water or electrolyte without an absorbent washer causes the mix to puff and foam up and may lead to shorts (low volt cells) caused by mix mud contacting the anode. A disadvantage of the impregnated washer is that it requires additional space within the cell (poor volumetric efficiency) and that it retains some of the water or electrolyte. Moreover, the washer is another part to be manufactured and it requires an additional step or station in the assembly sequence of a dry cell.

Accordingly, it is the principal object of the invention to provide improved means for maintaining a sufficient quantity of water or electrolyte in dry cells.

It is another object to improve the discharge efficiency of dry cells.

Yet another object is to improve the shelf and service life of dry cells.

These and other objects of the invention are achieved by a dry cell comprising a gelatinous solution dispensed on top of the depolarizing mix. The gelatinous solution has a desired viscosity and is comprised of electrolyte or water or a mixture thereof and a suitable colloidal gel-forming material such as carboxy methyl cellulose or conventional battery pastes such as flour and starch. After a few hours at most, the liquid disperson medium of the solution soaks and penetrates deep into the mix and is indistinguishable from the electrolyte originally present in the depolarizer. The gel-forming material is probably filtered out after penetrating a short distance into the mix and some gelling residue may remain on the surface of the mix, however, as a sort of binder or very thin film.

The invention will become more readily apparent from the following description and claims, taken in reference to the annexed drawing in which the sole figure is a vertical cross-sectional view of a dry cell assembly embodying the invention prior to the gelatinous solution soaking into the mix and disappearing from the top surface thereof.

Referring now to the drawing, there is shown a paper or film lined dry cell generally indicated by the reference numeral 10. The dry cell 10 is of conventional construction comprising a container-anode 12 of a consumable metal, for instance, zinc, having therein a depolarizer mix 14, a paper or film separator 16 and a cathode current collector 18 of carbon which extends into contact with a conventional top closure 20. The gelatinous solution 22 is disposed on the top surface of the depolarizing mix 14.

The gelatinuous solution 22 is prepared by mixing together a suitable gel forming agent and a liquid dispersion medium such as water and/or an electrolyte for a dry cell. The gelling agent is added to and mixed with the medium until a colloidal solution is obtained.

In operation, the gelatinous solution 22 is dispensed on top of the depolarizer mix 14 and shortly thereafter the solution 22 slowly penetrates and soaks into the depolarizing mix 14 thereby providing the necessary additional electrolyte. There is no foaming up of the depolarizer mix 14 because of the slow rate of penetration of the solution 22. Since the solution 22 is viscous, it does not readily splash or run off the top surface of the depolarizing mix 14 during the subsequent sealing operations normally pursued in the manufacture of dry cells.

The instant invention has been illustrated by a form of construction, of a widely used primary cell of the Le Clanché type. It should be understood that the present invention is not restricted to cells of such construction or even to the Le Clanché system, and that the gelatinous solution of the invention may be incorporated in other cell constructions and systems, for example, cooked-paste bobbin cells, flat Le Clanché dry cells and the aluminum-manganese dioxide or magnesium-manganese dioxide cell systems.

Examples of suitable gelling agents for use in the practice of the invention are colloids or colloid-forming materials such as methyl cellulose ether, corboxymethyl methyl cellulose, sodium carboxy methyl cellulose, polyvinyl alcohol, hydroxy propyl methyl cellulose, the calcium salts of the copolymer of maleic anhydride, vinyl acetate, and other equivalent materials as well as various gums. The term "gum" used herein is a designation of a class of colloidal substances, glutinous when moist, but hard when dried, and which are exuded by or extracted from plants. Suitable gums and gum-like material are guar gum or modified high quality guar gum sold under the trademark "Guartec" by General Mills, locust bean gum, gum karaya, gum tragacanth, low methoxy pectin, gelatin, agar agar, alginates, gum arabic, hydroxyethyl cellulose. Irish moss and sodium polyacrylate are also suitable gelling agents.

The colloids or other gelling agents or mixtures thereof used in the practice of the invention must of course be compatible within the cell system, i.e., they must not be readily oxidized by the cell cathode and must not be readily hydrolyzed by the cell electrolytes. They must also be capable of swelling when contacted by cell electrolytes and they should also form a viscous solution in water alone. Example of electrolytes which are suitable for use in the practice of the invention are ammonium chloride, zinc chloride, magnesium bromide and aluminum halides such as aluminum chloride.

The viscosity of the colloidal solution is dependent on the weight percentage of gelling agent dissolved, and in the case of sodium carboxy methyl cellulose, for example, "cellulose gum—CMC-7H," manufactured by the Hercules Powder Co., a concentration of from about 0.6 to about 1.2% would be satisfactory. Viscosity of a 1% solution according to the specifications of the manufacturer of "CMC-7H" should be in the order of from about 1,000 to about 2,200 centipoises at 25° C. The viscosity of the solution must be such that the solution does not behave as does water or electrolyte alone, i.e. it should not cause the mix to puff and foam up the top surface of the mix nor should it be so viscous that it would be difficult to handle and would not soak into the mix. The solution should slowly soak into the depolarizer mix and provide the necessary additional electrolyte with a minimum of foaming action.

A more specific upper and lower limits of viscosity has been determined to be from about 130 to about 210 seconds through a No. 4 Ford cup at about 25° C. These limits are determined by a viscosity test method which is conventionally used in the paint and varnish industry. The test consists of filling a cup having a conical shaped bottom and having an orifice at the bottom thereof, until it overflows into a trough positioned about the upper periphery of the cup. The orifice is closed by a suitable valve device and the solution in the metered cup is initially timed as it flows through the orifice of the cup as soon as the orifice is opened. The first break in the stream which occurs when the cup is about empty determines the ending time of the viscosity test. Other cups having different size orifices are used for more viscous or less viscous substances.

In order to illustrate the service values of dry cells of the invention, several standard tests were conducted. In these tests, dry cells embodying the invention were employed, together with dry cells of a construction otherwise identical, but having only water added on top of the mix. These cells are referred to hereinafter as "control cells." All the service values tabulated below in Table I represent the arithmetic mean averages. The procedures followed in the tests are outlined in the National Bureau of Standards, handbook 71, entitled, "Specification for Dry Cells and Batteries." Cells of each lot given in Table I were subjected to a 4 ohm continuous flashlight test, a 4 ohm heavy industrial flashlight test (HIF), a 4 ohm light industrial flashlight test (LIF) and a 2¼ ohm light industrial flashlight test. The voltage cutoff value for each test is indicated in the table.

Control Lot No. 1 constituted standard D size cells having 54 grams of mix (1.630" mix height) and having 0.3 cc. of water added to the top of the mix, which is all the cell would accept without harm. Sample Lot No. 2 constituted a similar D size cell but having a gel addition (1 cc.) which it is capable of accepting without harm in the form of a 1% by weight solution of sodium carboxy methyl cellulose in water. The cells of Control Lot No. 1 could not take on any more water without causing the mix to lose its physical shape, that is if it puffs and foams up too much, or is allowed to become mud-like, it could rise and flow over the top edge of the separator and make contact with the anode. Since the mix is conductive, shorts are generated and the cell output voltage is thereby reduced. Sample Lot No. 3 comprised 52 grams of mix (1.570" mix height) and a 1% by weight solution of sodium carboxy methyl cellulose in water. The results of the tests are identified in Table I as A and B and these results represent two different (but identical) batches of cells which were made about two to three weeks apart.

|  | Control Lot No. 1 (Average service in minutes) | | Sample Lot No. 2 (Average service in minutes) | | Sample Lot No. 3 (Average service in minutes) | |
| --- | --- | --- | --- | --- | --- | --- |
|  | A | B | A | B | A | B |
| 4 Ohm Continuous Test, to 0.75 v. cutoff | 281 | 288 | 306 | 313 | 303 | [1] 276 |
| 4 Ohm HIF test, to 0.9 v. cutoff | 421 | 392 | 461 | 459 | 454 | [1] 365 |
| 4 Ohm LIF test, to 0.9 v. cutoff | 733 | 720 | 763 | 777 | 733 | 712 |
| 2¼ Ohm LIF test, to 0.65 v. cutoff | 390 | [1] 370 | 437 | 432 | 418 | 388 |

[1] One value dropped from average.

The improved discharge efficiency of the cells of the invention as indicated by the results of the cells of Lot No. 2 was advantageously utilized by reducing the mix content of the cells of Lot No. 3 from 54 grams to 52 grams in an attempt to obtain an average service value for these cells which would be comparable to those cells of the Control Lot No. 1.

The tests show that all of the sample cells of the invention exhibit longer service values except the first three tests on the Lot No. 3 (B) cells. This can be attributed to the fact that there were a couple of low values which reduced the average considerably and that the Lot No. 3 cells contained only 52 grams of mix rather than 54 grams. It must be noted that the cells of Lot No. 2 exhibited better performance than the Control Lot.

The invention aids the dry cells in other ways; for example, the gelled solution immobilizes the mix which is generally slightly cracked and chipped on the top. The gel covers over this mix surface and flows down into the cracks and thus holds the mix in place so that it can be reactively utilized. This function would also be of value to dry cells which are subject to vibration or impact. Another probable advantage of the invention is that the gel layer may provide a sufficient barrier which would protect the anode from any oxygen which may find its way into the cell past the top seal; thus, the gel layer would constitute a physical barrier to gaseous diffusion.

What is claimed is:

1. In a dry cell comprising an anode and a porous depolarizer mix, the improvement, whereby said dry cell exhibits improved shelf and service life, which comprises a mix-penetrating gelatinous solution in contact with an exposed surface of said depolarizing mix, said mix-penetrating gelatinous solution comprising a gel-forming colloid and at least one liquid dispersion medium selected from the group consisting of water and an electrolyte for said cell; said mix-penetrating gelatinous solution serving to soak and penetrate into said depolarizer mix thereby providing additional moisture thereto and extending the shelf and service life of said cell.

2. The improvement of claim 1 wherein said gel-forming colloid is a material selected from the group consisting of carboxy methyl cellulose, flour, starch, methyl cellulose ether, carboxymethyl methyl cellulose, sodium carboxy methyl cellulose, polyvinyl alcohol, hydroxy propyl methyl cellulose, the calcium salts of the copolymer of maleic anhydride, vinyl acetate, guar gum, locust bean gum, gum karaya, gum tragacanth, low methoxy pectin, gelatin, agar agar, alginates, gum arabic, hydroxyethyl cellulose, Irish moss and sodium polyacrylate.

3. The improvement of claim 2 wherein said gel-forming colloid is sodium carboxy methyl cellulose.

4. The improvement of claim 3 wherein said liquid dispersion medium is water.

5. The improvement of claim 4 wherein said gel-forming colloid is in the form of from about 0.6 to about 1.2% by weight solution of said sodium carboxy methyl cellulose.

6. The improvement of claim 5 wherein said gel-forming colloid is in the form of about a 1% by weight solution of said sodium carboxy methyl cellulose.

7. In a dry cell comprising a container-electrode of a consumable metal, a separator and a porous depolarizer mix, the improvement, whereby said dry cell exhibits improved shelf and service lift, which comprises a mix-penetrating gelatinous solution in contact with an exposed surface of said depolarizing mix, said mix-penetrating gelatinous solution comprising an electrolyte for said cell and sodium carboxy methyl cellulose and having a viscosity of from about 130 to about 210 seconds when measured through a No. 4 Ford cup at about 25° C., said mix-penetrating gelatinous solution serving to soak and penetrate into said depolarizer mix thereby providing additional electrolyte thereto and extending the shelf and service life of said dry cell.

8. The improvement of claim 7 wherein said sodium carboxy methyl cellulose is in the form of about a 1% by weight solution in said electrolyte.

9. The method of improving the shelf and service life of dry cells comprising dispensing on an exposed surface of the depolarizing mix of said cell a mix-penetrating gelatinous solution, said mix penetrating gelatinous solution comprising a gel-forming colloid and at least one liquid dispersion medium selected from the group consisting of water and an electrolyte for said cell.

10. The method of claim 9 wherein said gel-forming colloid is a material selected from the group consisting of carboxy methyl cellulose, flour, starch, methyl cellulose ether, carboxymethyl methyl cellulose, sodium carboxymethyl cellulose, polyvinyl alcohol, hydroxy propyl methyl cellulose, the calcium salts of the copolymer of maleic anhydride, vinyl acetate, guar gum, locust bean gum, gum karaya, gum tragacanth, low methoxy pectin, gelatin, agar agar, alginates, gum arabic, hydroxyethyl cellulose, Irish moss and sodium polyacrylate.

11. The method of claim 10 wherein said gel-forming colloid is sodium carboxy methyl cellulose.

12. The method of claim 11 wherein said liquid dispersion medium is water.

13. The method of claim 12 wherein said gel-forming colloid is in the form of about a 1% by weight solution of said sodium carboxy methyl cellulose.

References Cited by the Examiner

UNITED STATES PATENTS

| | | | |
|---|---|---|---|
| 1,490,455 | 4/1924 | Combs. | |
| 1,654,227 | 12/1927 | Vignon. | |
| 2,606,941 | 8/1952 | Ruben | 136—157 |
| 2,704,780 | 3/1955 | MacFarland. | |
| 2,773,926 | 12/1956 | Glover | 136—107 |
| 2,942,057 | 6/1960 | Huber et al. | 136—107 |
| 3,016,414 | 1/1962 | Priebe | 136—107 |

WINSTON A. DOUGLAS, *Primary Examiner.*

JOHN H. MACK, ALLEN B. CURTIS, *Examiners.*